United States Patent [19]
Kellogg et al.

[11] 3,840,801
[45] Oct. 8, 1974

[54] INDICATOR LIGHT TESTING CIRCUIT
[75] Inventors: Walter J. Kellogg; Glenn R. Taylor, both of Beaver; Chester W. Calvin, Beaver Falls, all of Pa.
[73] Assignee: Westinghouse Electric Corporation, Pittsburgh, Pa.
[22] Filed: Sept. 18, 1973
[21] Appl. No.: 398,353

[52] U.S. Cl. ............................... 324/21, 340/214
[51] Int. Cl. ........................................... G01r 31/22
[58] Field of Search .................. 324/20, 21, 22, 23; 340/214, 251

[56] References Cited
UNITED STATES PATENTS
2,839,741  6/1958  Kratville ........................... 340/213
3,040,243  6/1962  Weiss .............................. 324/20 R Primary Examiner—Alfred E. Smith
Assistant Examiner—Rolf Hille
Attorney, Agent, or Firm—H. G. Massung

[57] ABSTRACT
A circuit for testing indicator lights whereby multiple lights may be tested simultaneously by pressing one pushbutton and closing one set of normally open contacts. The test pushbutton and the indicator signal operate at a higher voltage such as 120 volts AC and the indicator lamp is operated at a low voltage such as 6 volts, providing safety and allowing use of inexpensive incandescent indicator bulbs. Only one indicator transformer is required for each indicator light. In one embodiment of the invention a pair of diodes are provided on the high voltage side of the indicator transformer to permit a test signal or a normal operating signal to activate the indicator bulb without affecting the rest of the circuit. A single common line is used to provide a return line for the test circuit and the operating signal circuit. In another embodiment of the invention a single diode is provided on the high voltage side of each indicator transformer for feeding a rectified AC signal to the indicator bulb and for isolating the indicator circuits. An AC normal operating signal can also be fed through the indicator circuit. This embodiment requires the use of only a single diode with each indicator transformer while providing for a single pushbutton test. A common return line is used for the test circuit and normal operating circuit. The illumination of the indicator bulbs when activated through the test circuit can be less than the illumination when activated through the normal indicator signal circuit.

10 Claims, 2 Drawing Figures

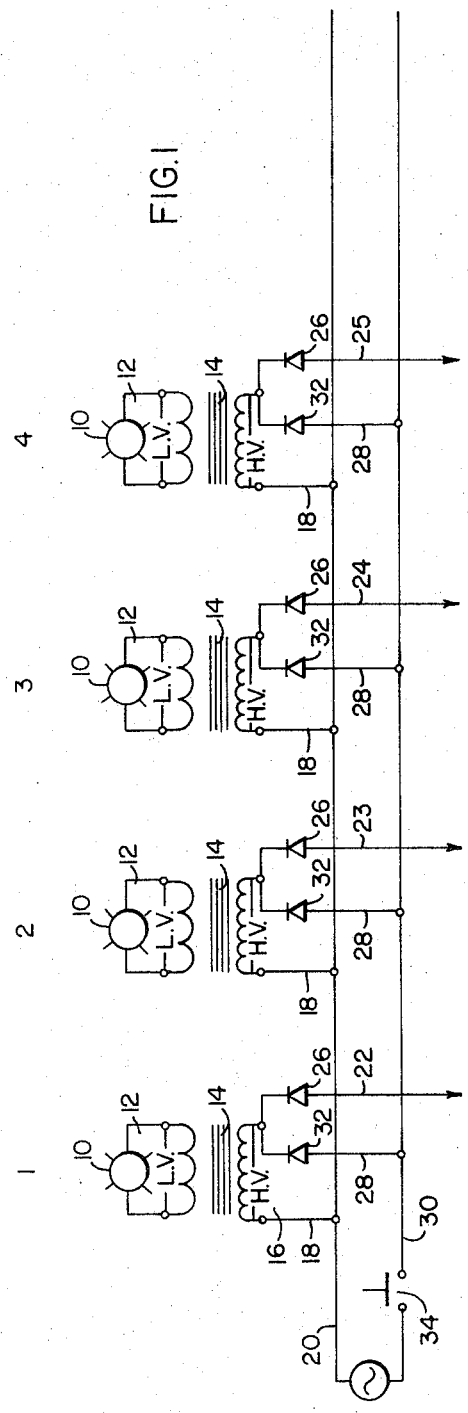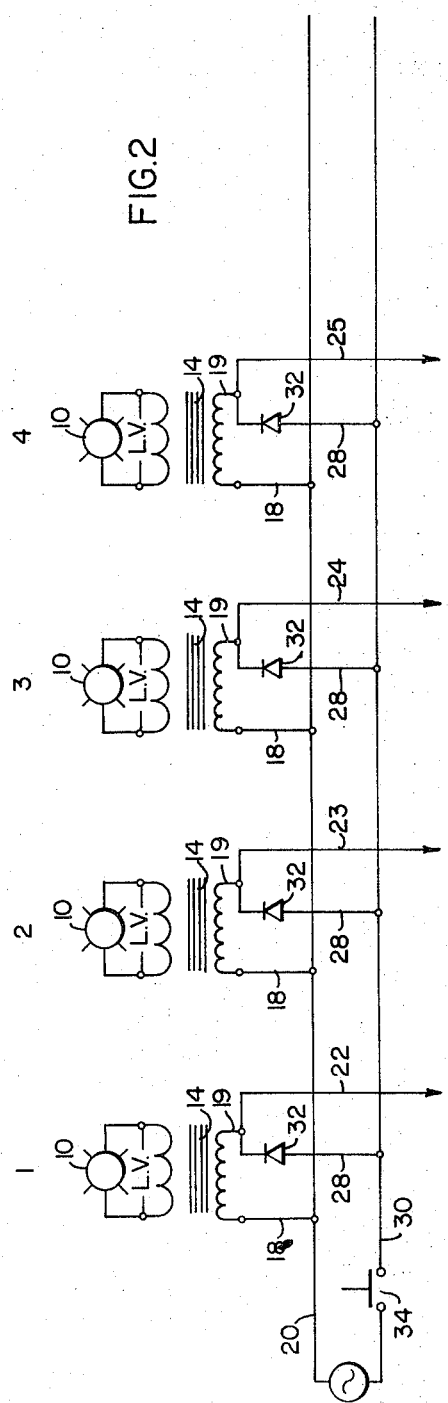

INDICATOR LIGHT TESTING CIRCUIT

BACKGROUND OF THE INVENTION

This invention relates to a test circuit for an indicator lamp and more particularly to an improved circuit for simultaneously testing indicator lamps utilizing a minimum number of components for high reliability and low cost.

On modern machinery there are many applications where multiple indicator lights are used. It is advantageous to have a means of rapidly testing many indicator lamps by depressing a single pushbutton. A problem with some of the prior art test circuits is that many relays or multi-pole pushbuttons are required in the test circuit. In some of the prior art indicator circuits, the normal signal circuits, the test circuit, and the indicator lamp circuit are all operated at the same potential. It is desirable to have a circuit in which the test pushbutton and the indicator signal are at a higher normal operating voltage such as 120 volts while the indicator lamp is maintained at a low voltage such as 6 volts for system safety and cost.

In prior art U.S. Pat. No. 3,040,243, issued June 19, 1962 to I. F. Weiss, a test circuit for an indicator system utilizing a single test pushbutton is disclosed. A problem with this circuit as disclosed in Weiss is that a separate transformer is required for the test circuit. The separate test transformer can cause polarity and installation difficulties. In this prior art circuit the diodes are disposed on the low voltage side of the transformers. In a low voltage indicator circuit the voltage drop across the diodes can be significant.

SUMMARY OF THE INVENTION

An indicator lamp circuit is provided in which each indicator lamp is directly connected to the low voltage side of an indicator transformer. A test circuit and a normal signal indicator circuit are connected to one leg of the primary high voltage side of the indicator transformer. The other leg of the indicator transformer is connected to a common line utilized by the test and indicator signal circuit.

In one embodiment of the invention a single diode is disposed in the test circuit connected to the primary leg of the indicator transformer. A normally open pushbutton is connected in the test circuit to supply power to the primaries of all the indicator transformers, through the diodes, when depressed. This allows for simultaneous testing of all the indicator lamps. When the test button is depressed a half-wave rectified test signal is supplied to the indicator transformer. When the indicator signal circuit is activated a normal alternating current wave is supplied to the primary side of the indicator transformer. This normal AC wave will cause the indicating lamp to burn more brightly than the half rectified test signal. The diode in the test circuit to which an AC signal is applied and the diodes in the other test circuits form a back to back rectifier circuit to prevent the AC signal from one signal circuit from influencing another signal circuit.

In another embodiment of the invention one diode is disposed in the test circuit connection to the indicator transformer and another diode is disposed in the signal circuit connection to the indicator transformer. Each indicator transformer has one leg of the primary side connected to a common line used by the test and signal circuit.

It is an object of this invention to provide an inexpensive highly reliable circuit for indicator lamps using a minimum number of components.

It is another object of this invention to provide an indicator circuit utilizing a single transformer for operating indicator lights at a low voltage for safety and to permit the use of inexpensive indicator lamps. It is a further object of this invention to provide a circuit where the test current and the signal current are fed to the high voltage side of the transformer and a common return is utilized.

BRIEF DESCRIPTION OF THE DRAWINGS

For a better understanding of the invention reference may be had to the preferred embodiments exemplary of the invention shown in the accompanying drawings in which:

FIG. 1 illustrates a test circuit utilizing the teaching of the present invention; and FIG. 2 illustrates the test circuit utilizing another embodiment of the invention.

DESCRIPTION OF THE PREFERRED EMBODIMENTS

Referring now to FIG. 1 there is shown an indicator light circuit utilizing the teaching of the present invention. A plurality of indicator lights 10 are connected to the low voltage side 12 of an indicator transformer 14. Each indicator lamp 10 is supplied power from a single indicator transformer 14. Operation of the indicating lamp 10 at a low voltage, such as for example 6 volts, allows for the use of inexpensive bulbs and provides for safe operation. The high voltage side 16 of transformer 14 can be supplied with a higher voltage level, such as normal 120 volts AC. One leg 18 of the primary connection of each indicator transformer 14 is connected to a common line 20. Indicator signals are supplied from various devices to the primary of transformer 14 through signal wires 22, 23, 24 and 25. A diode 26 is disposed in each of signal wires 22, 23, 24 and 25 circuit. An alternating current indicator signal is sent along indicator wire 22, 23, 24 and 25 when various signal devices (not shown) are activated. Diode 26 rectifies the current which flows through indicating transformer 14 to illuminate signal light 10. The test signal line 28 is connected between the primary of transformer 14 and a common test line 30. A diode 32 is disposed in each test signal line 28. A single pole normally open pushbutton is disposed in common test signal line 30. When pushbutton 34 is depressed an alternating current test signal is sent along line 30 into lines 28 through diodes 32 and indicator transformers 14 to light indicators 10. Diode 26 in the operating signal circuit prevents the test signal from flowing into operator signal line 22, 23, 24 or 25. Diode 32 in the test signal line 28 prevents operating signals from flowing into the common test signal line 30. Thus each indicator light 10 can be activated by either a test signal or an operating signal. Each indicator 10 can be energized by an operating signal without energizing any other indicator light 10. Common line 20 connected to primary leg 18 of transformer 14 acts as a common return for test signals and for indicator signals. The voltage rating of diodes 26 and 32 can be selected to be high enough to provide a large safety factor. For Example, a 200 V.

rated diode would be used on a 120 V. AC (170V peak) circuit for highly reliable operation. Since diodes 32 and 26 are disposed on the high voltage primary side of transformer 14 any small voltage drop across them is not significant. Unlike the prior art an individual transformer is not required in the test circuit.

Referring now to FIG. 2 there is shown an indicator lamp circuit for four signals utilizing the teaching of the present invention. Each indicator lamp 10 is supplied from the low voltage side of an indicator transformer 14. The primary leg 18 of each transformer 14 is connected to a common line 20. An alternating current signal can be applied to primary leg 19 to activate indicator lamp 10. Thus when an operating signal is applied, indicator lamp 10 is activated by a normal alternating current waveform. Test line 28 is connected from a common test line 30 to the primary leg 19 of each indicator transformer 14. A pushbutton 34 being normally open is disposed in common test line 30 to apply a test signal to line 30 when depressed. The diode 32 is disposed in each test line 28. When an operating signal is applied to any signal line 22, 23, 24 or 25 the indicator 10 associated with this signal line will be energized. The diode 32 associated with this signal line 22, 23, 24 or 25 in conjunction with the other diodes 32 in the circuit will prevent any of the other indicators 10 from being energized. Each diode 32 with the other diodes 32 form a back-to-back rectifier pair which will not pass current. When it is desired to test indicators 10 pushbutton 34 is depressed and all indicators 10 are energized. Rectifiers 32 allow a one-half wave rectified signal to pass through the primary of indicator transofrmer 14. This causes signal lamp 10 to be illuminated. However, illumination of signal lamp 10 will not be as great when energized with a test signal as when energized with a normal alternating current signal. Thus even with the test pushbutton 34 depressed it is possible to discern when an operating signal is fed to transformer 14 through signal line 22, 23, 24, 25.

The disclosed indicator light circuit provides for an improved circuit for indicator light whereby the lights 10 on the panel may be tested simultaneously by pressing one pushbutton 34 and closing one set of normally open contacts so as to energize a transformer 14 supplied for each indicator lamp 10. This circuit provides for simultaneously testing operativeness of all lights whether in a lighted or unlighted state and also permits lighting of some of the indicators when such test pushbutton 34 is not closed. This circuit provides for the use of 120 volt alternating current for test and normal operating signals and still offers the advantage of safety and inexpensive bulbs of the transformer type indicator. An individual transformer for the test circuit is not required. In one embodiment only a single rectifier is required for each indicator light 10. This provides for an inexpensive reliable indicator lamp circuit having a minimum number of components.

We claim:
1. An indicator light circuit comprising:
a plurality of indicator lights;
a transformer associated with each of said indicator lights having a primary side and a secondary side with only said associated indicator light being connected across the secondary of said transformer;
test circuit means connected to the primary of each of said transformers for supplying a test current to the primary of all of said transformers when a check of said plurality of indicator lights is required;
signal circuit means associated with each of said plurality of transformers for supplying current to the primary of said associated transformer in response to operation of an external component; and
isolating means disposed in the primary connection to each of said transformers for preventing current flow from said signal circuit means through said test circuit means to the primary of any other transformer.

2. An indicator light circuit as claimed in claim 1 wherein:
a first diode is disposed in the test circuit means connection to each of said transformers; and,
said signal circuit means and said test circuit means share a common return line.

3. An indicator light circuit as claimed in claim 2 including:
a second diode connected in the signal circuit connection to each of said plurality of transformers and being disposed to pass current of the same polarity as the current which can pass through said first diode.

4. An indicator light circuit comprising:
a plurality of transformers having a primary side and a secondary side;
a plurality of indicator lights each being connected across the secondary of one of said plurality of transformers;
a plurality of signal circuits each being connected to the primary of one of said plurality of transformers;
a test circuit for testing the operability of said plurality of indicator lights connected to the primary of all of said plurality of transformers; and
isolating means disposed in the primary connection to each of said transformers for preventing current flow from one of said plurality of signal circuits to another of said plurality of signal circuits.

5. An indicator light circuit as claimed in claim 4, wherein said isolating means comprises:
a first plurality of uni-directional current conductors each being disposed in the connection of said test circuit to the primary of each of said plurality of transformers.

6. An indicator light circuit as claimed in claim 5, wherein said isolating means comprises:
a second plurality of uni-directional current conductors each being disposed in the connection of one of said plurality of signal circuits to one of said transformers; and,
each uni-directional current conductor oriented so as to pass current of a polarity which will be blocked by one of said first plurality of uni-directional current conductors disposed in the connection of said test circuit to the primary of said transformer.

7. An indicator light circuit as claimed in claim 6 including:
a common return line forming a part of said plurality of signal circuits and a part of said test circuit.

8. An indicator light circuit comprising:
a plurality of indicator lights;
an indicator transformer for each of said plurality of indicator lights having a high voltage side and a low voltage side;

each of said indicator lights being connected to the low voltage side of said associated indicator transformer;

each of said indicator transformers having a first high voltage side leg and a second high voltage side leg;

an alternating current test current source;

a normally open pushbutton having an input connection, connected to said alternating current test current source, and an output connection;

a test line for each indicator transformer disposed between and connected to the first high voltage side leg of said indicator transformer and the output connection of said normally open pushbutton;

a diode disposed in each of said test lines limiting current flow to one direction;

an operating signal line connected to the first high voltage side leg of each of said indicator transformers; and, signal indicator means for energizing each of said signal lines with an alternating current in response to external signals.

9. An indicator light circuit as claimed in claim 8 comprising:

a common conductor;

conducting means connecting the second high voltage side leg of each of said indicator transformers to said common conductor.

10. An indicator light circuit as claimed in claim 9 comprising:

a signal circuit diode disposed in each of said signal conductors;

each of said signal circuit diodes being oriented so to permit current flow through the high voltage side of said indicator transformer in the same direction as that permitted by the associated test circuit diode.

* * * * *